United States Patent [19]

Studtmann

[11] Patent Number: 4,488,101
[45] Date of Patent: Dec. 11, 1984

[54] STARTING SYSTEM FOR CHOPPER CONTROLLED MOTOR-COMMUTATED THYRISTOR INVERTER

[75] Inventor: George H. Studtmann, Mount Prospect, Ill.

[73] Assignee: Borg-Warner Corporation, Chicago, Ill.

[21] Appl. No.: 452,557

[22] Filed: Dec. 23, 1982

[51] Int. Cl.³ .............................................. H02P 5/40
[52] U.S. Cl. .................................... 318/800; 318/811
[58] Field of Search ................. 318/769, 798, 799, 800, 318/801, 802, 803, 805–811, 778–782, 139; 363/34, 37, 135–138

[56] References Cited

U.S. PATENT DOCUMENTS

| | | | |
|---|---|---|---|
| 3,665,286 | 5/1972 | Ohno et al. | 318/341 |
| 3,670,224 | 6/1972 | Jensen | 318/779 |
| 3,887,859 | 6/1975 | Hubner | 318/341 |
| 4,072,882 | 2/1978 | Wiart et al. | 318/227 |
| 4,123,692 | 10/1978 | Gilmore et al. | 318/811 |
| 4,123,692 | 10/1978 | Gilmore et al. | 318/227 |
| 4,134,055 | 1/1979 | Akamatsu | 318/696 |
| 4,150,324 | 4/1979 | Naito | 318/139 |
| 4,186,435 | 1/1980 | Cailloux | 363/37 |
| 4,236,201 | 11/1980 | Okado | 363/138 |
| 4,267,498 | 5/1981 | Torok | 318/800 |

Primary Examiner—E. A. Goldberg
Assistant Examiner—A. Evans
Attorney, Agent, or Firm—James E. Tracy

[57] ABSTRACT

If the thyristor switching devices of a chopper controlled inverter are normally motor-commutated during running operation, a starting system is needed to initially rotate the motor fast enough to develop a sufficient back EMF in the motor for motor commutation to occur. This is achieved by regulating the operation of the chopper to produce bus current pulses and by gating the thyristors on in predetermined sets and in a prescribed sequence to current pulse energize the motor to effect step-by-step rotation. After a set of conducting thryistors have supplied a bus current pulse to the motor, the reactive energy that builds up and becomes locked or stored in the inductances, through which the motor current flows, must be dissipated in order to commutate the conducting thyristors off and reduce the motor current to zero before the next set of thyristors are turned on. The required energy dissipation is accomplished by a circuit path which is effective during the intervals between the bus current pulses from the chopper. A d-c voltage source, in the circuit path causes the reactive energy to be rapidly absorbed, to permit faster turn on of the next set of thyristors and consequently faster starting. Once the motor has reached a speed sufficiently high to permit motor commutation to occur, and SCR is gated on to by-pass the d-c voltage source and provide a low loss free-wheeling path for reactive energy during running operation of the system.

10 Claims, 3 Drawing Figures

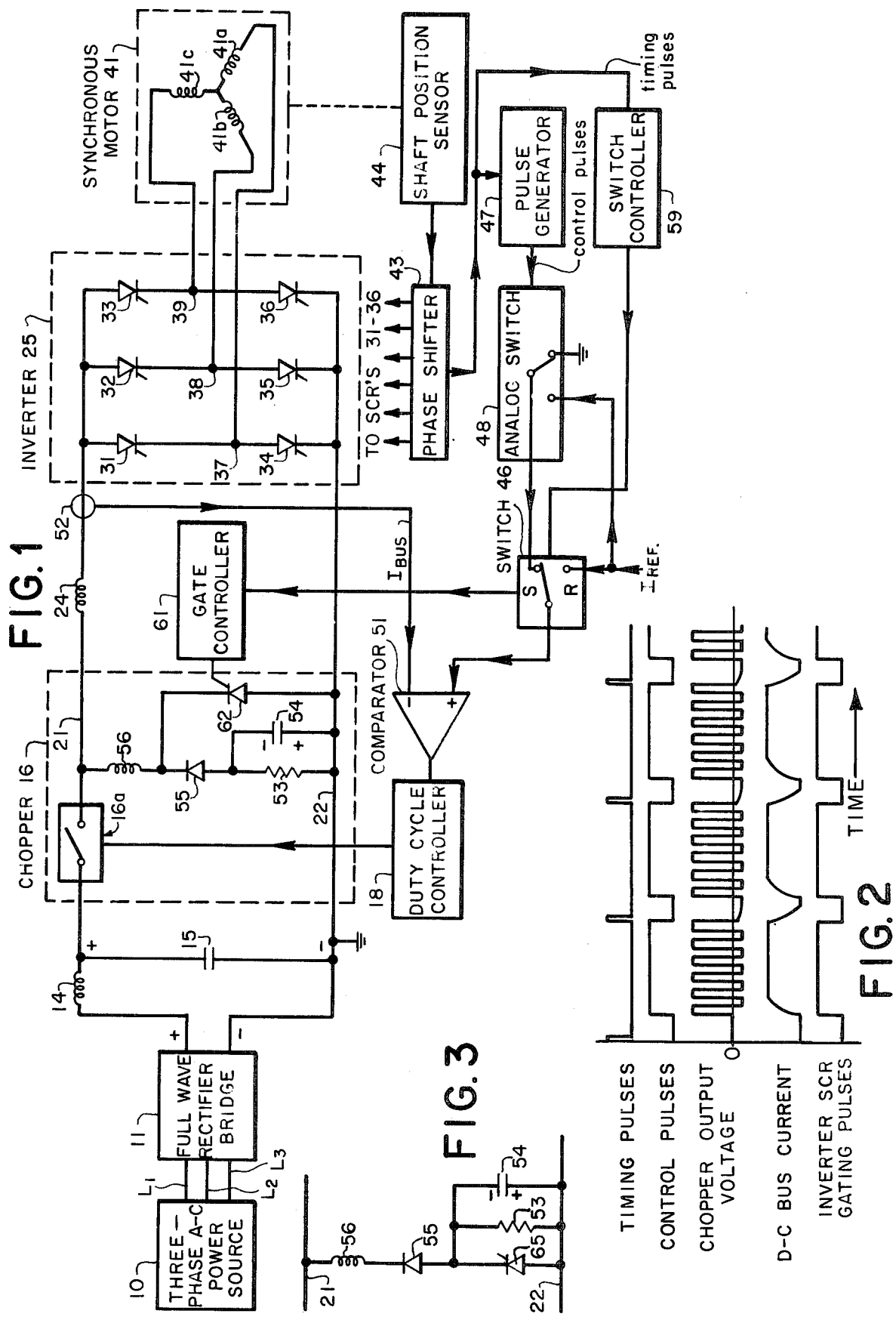

STARTING SYSTEM FOR CHOPPER CONTROLLED MOTOR-COMMUTATED THYRISTOR INVERTER

BACKGROUND OF THE INVENTION

This invention relates to a starting circuit for a chopper-powered, thyristor inverter-motor system, where the thyristors in the inverter are motor-commutated during running operation.

Anytime a motor-commutated thyristor inventer is employed to drive a motor, a starting system is required to initiate motor rotation and increase the speed until sufficient commutating motor voltage is provided. To explain, the thyristor switching devices (which usually take the form of silicon controlled rectifiers or SCR's) in the inverter are gated or turned on in predetermined sets and in a prescribed sequence in order to convert an applied d-c bus voltage, received over a d-c bus from a d-c power supply, to a-c voltage for application to the motor. Before each set of thyristors are fired into conduction, at least one previously conducting thyristor must be commutated or switched off. Forced commutation circuitry may be obviated by using a motor, such as a synchronous motor, which is constructed to present a leading power factor to the inverter drive, the alternating current in each of the motor's stator windings thereby always leading the alternating motor voltage across that winding. Design techniques for constructing a synchronous motor to have a leading power factor are well understood in the art. Basically, it involves providing a motor back EMF (electromotive force) that is greater than the applied inverter voltage. The back EMF is induced in the stator windings by the rotating flux produced by the magnet (either a permanent magnet or an electromagnet) in the rotor. With a leading power factor the thyristors will be motor-commutated, meaning that when a thyristor is gated on it will cause the back EMF to reverse bias and to turn off a previously conducting thyristor, the motor current thereby effectively transferring to the on-comming thyristor.

The problem presented with a motor-commutated thyristor inverter is that the motor must be running in order for the rotating flux from the rotor to cut the stator windings and induce therein a back EMF of adequate magnitude to commutate the thyristors. A starting system of some type must therefore be employed to start the motor rotating and bring it up to a speed at which the required back EMF will develop and take over the commutation of the inverter. Starting systems have been developed which regulate the d-c power supply and the inverter to apply time-separated current pulses to the stator windings of the motor to effect step-by-step motor rotation at an increasing or accelerating rate until the back EMF reaches a minimmum threshold level at which motor commutating and normal running operation occur.

When the d-c power supply comprises a phase-controlled rectifier bridge, which rectifies a-c line voltage and produces an adjustable d-c bus voltage, starting of a motor-commutated thyristor inverter may be achieved by turning the thyristors on in predetermined sets and in a prescribed sequence to current pulse energize the motor windings, which produces torque to crank or turn the motor one step at a time. During the starting mode, before each set of thyristors are gated on, the previously conducting thryistors must be commutated off by some means. When a current pulse is supplied from the phase-controlled rectifier bridge and through the conducting thyristors to the motor windings to turn the motor one step, reactive energy builds up and becomes stored in the inductances through which that motor current passes. In addition to the motor inductance, the motor current generally flows through a separate inductance connected in series with the d-c link or bus to provide current limiting protection in the event of a short circuit across the d-c bus and to filter or smooth out the current. The reactive energy locked in these inductances at the termination of each current pulse delivered to the motor must, of course, be removed before the conducting thyristor set can be commutated off and the next set turned on. The necessary removal of energy has been accomplished by regenerating energy from the load and back into the a-c line. The reactive power is made to flow from the inductances to the a-c line voltage, where the power is rapidly absorbed. Supplying the reactive energy through the phase-controlled rectifier bridge to the a-c line is achieved by appropriate gating or phasing of the rectifying devices (usually SCR's) in the rectifier bridge. Relatively fast absorption of the reactive energy is necessary to minimize the decay time of the motor current to zero at the termination of each energizing pulse so that the next set of thyristors may be switched on to turn the motor another step. Of course, the pulse actuation of the motor must eventually occur at a rate fast enough to allow the back EMF to develop and take over the commutating function, the inverter-motor system thereby becoming self-commutating. Hence, the decay time of the motor must be short enough so that the energizing current pulses may be supplied to the motor at the frequency needed to develop an adequate back EMF commutating voltage in the motor.

If the motor-commutated inverter is controlled by a chopper, rather than a phase-controlled rectifier bridge, motor starting becomes much more difficult. A chopper is a D-C to D-C converter having a chopper switch which is alternated between on and off conditions at a relatively high frequency, such as around 2,000 cycles per second or hertz, to pulse-width modulate or duty cycle modulate a fixed magnitude d-c voltage, usually developed from a-c line voltage by a full wave rectifier bridge, to produce chopped d-c voltage, namely a series of periodically recurring voltage pulses of adjustable width. The chopper is followed by a relatively small inductor, connected in series with the d-c bus or link and customarily called a delay inductance, whose prime purpose is to provide current limiting in the event of a lock-on of two SCR's in the inverter. The delay inductor along with the motor inductance also serve to filter the output voltage and current from the chopper. The higher the chopper frequency, the less filtering required. An average d-c bus voltage will thus be applied to the inverter and an average bus current will be supplied through the inverter to the motor, the average values being determined by the duty cyle of the chopper. The greater the duty cycle, the wider the voltage pulses and the greater the average bus voltage and average bus current. A free-wheeling diode, which is considered to be part of the chopper, is shunt-connected across the d-c bus to provide a path for the reactive energy in the delay and motor inductances each time the chopper switch is turned off. When the voltage applied to an inductance is suddenly terminated, the inductance tends to keep the current flowing in the same direction thereby smoothing out the bus current. Hence, with this arrangement the motor current continues to flow through the same circuit and in the same direction during the off times of the chopper switch. As long as the chopper switch is being alternated between open and closed positions, continuous d-c bus current will flow to the motor.

The problem encountered in trying to start a chopper energized motor-commutated inverter is that the reactive energy cannot be regenerated back through the rectifier bridge, which comprises diode rectifiers rather than controllable SCR's, to the a-c line for rapid absorption as is possible when a phase-controlled rectifier bridge is employed. When a chopper is operated to develop a current pulse for energizing a motor and turning it one step, the reactive energy in the delay and motor inductances causes motor current to continue to flow through the previously conducting thyristors and the free-wheeling diode until the energy is eventually dissipated and the current decays to zero. Unfortunately, with such a discharge a relatively long time would be required to completely dissipate the reactive energy and reduce the motor current to zero. Since another energizing current pulse cannot be produced by the chopper and a new set of thyristors gated on until the current flowing through the previously conducting thyristors decays to zero, the relatively long decay time limits the rate at which the thyristors may be gated on during the starting mode. Actually, the decay time may be so long that the motor cannot be stepped around fast enough for a sufficient back EMF to develop to start motor commutating.

This starting problem of chopper controlled motor-commutated thyristor inverters has now been overcome by the present invention. A unique starting system of relatively simple and inexpensive construction is provided for efficiently and rapidly starting any chopper powered motor-commutated inverter.

SUMMARY OF THE INVENTION

The invention provides a starting system for an inverter-motor system wherein a synchronous motor is driven, during running operation, by the output a-c voltage developed by a thyristor inverter, having a series of motor-commutated thyristors that are gated on in predetermined sets and in a prescribed sequence, from an applied adjustable d-c bus voltge received over a d-c bus and through a series-connected delay inductance from the output of a controlled chopper. The starting system comprises means for controlling the chopper to apply bus current pulses to the inverter and for gating on a new set of thyristors during each bus current pulse to supply time-separated energizing current pulses to the synchronous motor to effect step-by-step rotation thereof. A circuit path is provided for dissipating the reactive energy that builds up and becomes locked in the delay and motor inductances when the chopper switch opens and begins the termination of a bus current pulse. In this manner the current through the conducting thyristors decays to zero so that these thyristors may turn off prior to the gating on of the next set of thyristors. A d-c voltage source is included in the circuit path for expediting the absorption of the reactive energy to decay time of the motor current to zero in order to facilitate faster operation of the thyristors. For the purpose of the description of this invention and the appended claims, the term d-c voltage source is taken to embrace both true voltage sources, such as batteries, or networks such as resistors, or resistor and capacitor combinations, which develop a voltage in response to a current passing through them. DESCRIPTION OF THE DRAWING The features of the invention which are believed to be novel are set forth with particularity in the appended claims. The invention may best be understood, however, by reference to the following description in conjunction with the accompanying drawing in which:

FIG. 1 schematically illustrates a starting system, constructed in accordance with the invention, and the manner in which that starting system is incorporated in a chopper controlled motor-commutated thyristor inverter to effect starting thereof;

FIG. 2 depicts various voltage and current signal waveforms, present during the starting mode, that will be helpful in understanding the operation of the starting system; and FIG. 3 depicts another embodiment of the invention.

DESCRIPTION OF THE ILLUSTRATED EMBODIMENTS

Referring to FIG. 1, line conductors $L_1$, $L_2$ and $L_3$ connect to a conventional three-phase A-C power source 10 which may be the usual A-C power mains, and thus provide three-phase a-c voltage, namely three alternating voltages varying in sinusoidal fashion and having the same amplitude and frequency but being phase-displaced with respect to each other by 120° C. The frequency of the a-c line voltage will usually be either 50 or 60 cycles per second or hertz, and the magnitude of those voltages may take any appropriate value depending on the characteristics of the load to be energized or driven. The a-c energy received over the line conductors is rectified and converted to d-c power by a full wave rectifier bridge 11. Series-connected inductor 14 and shunt-connected capacitor 15 filter the rectified voltage from bridge 11 to develop, across the capacitor, a filtered d-c voltage of fixed magnitude and having the polarity indicated in FIG. 1. Of course, the constant magnitude of the d-c voltage will be determined by the amplitude of the three-phase a-c voltage. For example, in a high horsepower application of the invention the a-c voltage applied to rectifier bridge 11 may have to be sufficient to produce a d-c voltage across capacitor 15 of around 600 volts. It will be appreciated that the necessary d-c voltage may be provided by a variety of different arrangements other than the one specifically shown. For example, a battery or bank of batteries may be used. As another example, the d-c source may take the form of a d-c generator driven by some prime mover.

The fixed magnitude d-c voltage produced by bridge 11 and filter 14, 15 is applied to a conventional chopper 16 having a chopper switch 16a (usually constituting a solid state switching device such as a transistor, SCR, etc.) which is alternately closed (on) and opened (off) under the control or command of duty cycle controller 18. Preferably, when chopper 16 is operated, switch 16a will be switched between its closed and open positions at a frequency around 2,000 cycles per second or hertz. Of course, the chopper frequency is not critical and can have any appropriate value. A high frequency is desirable to minimize the filtering requirements. There are various ways to modulate the chopper switch so as to control the average output voltage. One common method uses a scheme in which the period or time interval covered by each pair of on and off times will always be the same and will be determined by the operating frequency, but the width of the on-time portion (called the duty cycle) of that period versus the off-time portion of that period is adjustable under the command of duty cycle controller 18. The greater the on-time, the less the off-time. Chopped d-c voltage, namely periodically recurring voltage pulses, will therefore appear at the output of chopper 16 across lines or conductors 21 and 22 which constitute a d-c bus, conductor 22 being connected to a ground plane of reference potential or circuit common. The peak amplitudes of a voltage pulses will always be the same (600 volts if the d-c voltage from source 11, 14 and 15 is 600 volts) but their pulse widths will be variable as determined by the output of controller 18. The average d-c bus voltage across d-c bus 21, 22 will therefore be directly proportional to the duty cycle. For example, with a 60% duty cycle and 600 volts applied to the chopper, the average d-c bus voltage will be 360 volts.

The d-c bus voltage is applied through a relatively small link inductor 24, usually called a delay inductance, to a thyristor inverter 25. Although helping to filter the chopper voltage pulses, the primary function of inductance 24 is to restrict the bus current in the event of an undesired lock-on of the thyristors in the inverter, namely when the wrong pair of thyristors are on at the same time causing a short circuit across the d-c bus 21, 22. Without the protection afforded by inductance 24 the faulted or conducting thyristors could be damaged or destroyed. If a lock-on or misfiring occurs, the delay inductance 24 absorbs the entire bus voltage and limits the current until the chopper can be shut off. Circuitry (not shown) may be provided to sense the bus current and to turn the chopper completely off when the current becomes excessive.

Thyristor inverter 25 is of the three-phase bridge type and has a well-known circuit configuration and a six-step operating cycle. It includes six thyristor switching devices, in the form of SCR's 31–36, arranged in three phases or legs, each leg having a pair of SCR's essentially series-connected across the d-c bus. The circuit junctions 37, 38 and 39 of the three legs connect to respective ones of the three wye-connected stator windings 41a, 41b and 41c of three-phase synchronous motor 41, whose output shaft (not shown) drives some mechanical load. Synchronous motor 41 may either by of the wound rotor type or the permanent magnet rotor type or any type suitable for a motor commutated drive. Its stator windings may be connected in a delta rather than a wye configuration.

by applying triggering or gating pulses to the gates of the six inverter SCR's 31–36 at prescribed times and in a prescribed sequence, the d-c voltage across the d-c bus 21, 22 is effectively changed to three-phase a-c voltage as applied to the stator windings 41a, 41b and 41c of motor 41, thereby delivering three-phase alternating current to the three windings to produce a rotating magnetic stator field to effect rotation of the motor at a speed determined by and directly proportional to the frequency of the inverter output a-c voltage. For example, if a gating signal is simultaneously supplied to SCR's 31 and 36 to turn those SCR's on, current will flow from line 21 and through, in the order named, inductance 24, the anode-cathode conduction path of SCR 31, junction 37, windings 41a and 41c of motor 41, junction 39 and the anode-cathode conduction path of SCR 36 to line 22 or ground. If the current through SCR 31 is then reduced to zero by some means, effectively commutating off the SCR, while at the same time SCR 32 is switched on and SCR 36 is maintained conductive, current will flow from line 21 and through, in the order named, inductance 24, SCR 32, junction 38, windings 41b and 41c, junction 39 and SCR 36 to line 22. In a typical operational sequence, the current through SCR 36 would then be reduced to zero and the SCR would be commutated off. At the same time, SCR 34 would be fired into conduction, SCR 32 remaining on. This would complete a circuit path for motor current to flow in the direction from line 21 and through, in the order named, SCR 32, junction 38, windings 41b and 41a, junction 37 and SCR 34 to line 22. In similar fashion, it will be understood that if the SCR's 33 and 34 are then made conductive, SCR 32 being commutated off, current will flow from junction 39 and through windings 41c and 41a to junction 37, and if SCR's 33 and 35 are thereafter maintained on at the same time, SCR 34 being commutated off, current will flow from junction 39 and through windings 41c and 41b to junction 38. Finally, to complete the six-step operating cycle of inverter 25, SCR 33 would then be commutated off while SCR's 31 and 35 would be made conductive to cause current flow from junction 37 and through windings 41a and 41b to junction 38. Of course, this described operation of inverter 25 and motor 41 is well understood in the art. By properly sequencing the SCR's on and off, the inverter effectively produces three phase-displaced six-step alternating voltages for application to respective ones of the three stator windings 41a, 41b and 41c, the three voltages being phase-displaced from each other by 120°. As is well known, the application of three-phase a-c voltage to the stator windings of a synchronous motor results in the development of a rotating magnetic field which causes the rotor to rotate in step or in synchronism with the stator field, the rotor speed or frequency thereby equalling the stator field frequency. The magnetic poles of the rotor are attracted by the revolving stator field and follow it in absolute synchronism producing torque by virtue of the magnetic interactions. There is no slip.

Synchronous motor 41 is constructed to present a leading power factor to inverter 25 at all times. The design techniques for achieving this are well understood in the art. Essentially, the back EMF developed in the motor must be made higher or greater than the applied motor voltage. With a leading power factor, the alternating motor current flowing through each stator winding will lead the alternating motor voltage across that winding. In well-known manner, during running operation when the motor is rotating in its normal speed range, and inverter 25 receives a d-c bus voltage along with properly timed and sequenced gating pulses for SCR's 31–36, the motor current will lead the motor voltage and the developed back EMF will commutate the appropriate SCR's off at the precise times necessary to maintain proper operation of inverter 25 and rotation of motor 41.

Gating pulses to switch the SCR's 31–36 on and off in the correct sequence and at the correct times, so as to provide the required three-phase a-c energy for producing a revolving magnetic stator field to rotate motor 41 in the desired manner, are supplied to the gates of the SCR's by phase shifter 43, the operation of which is controlled by shaft position sensor 44. This is a well-known arrangement for controlling the operation of an inverter. The shaft position sensor monitors the shaft position, and thus the rotor position, of motor 41 and in response to that sensed information the phase shifter 43 steers the gating pulses to the correct SCR's in the inverter to turn them on in the required prescribed sequence. In effect, sensor 44 continually tells phase shifter 43 the precise instantaneous position of the revolving rotor and from that information the phase shifter determines the particular SCR's that must be made conductive to maintain rotation of the magnetic stator field so that the rotor will continue to revolve.

To develop the three phase-displaced, six-step alternating voltages for application to respective ones of the three stator windings, the switching or firing pattern of the inverter SCR's 31–36 must change every 60° of an operating cycle. After every 60° a conducting SCR must be commutated off and a new set of SCR's must be made conductive. Timing pulses (the function of which will be explained later) representing the switching times will be produced at an output of phase shifter 43, as indicated in FIG. 1. As will be appreciated, each timing pulse occurs a fixed time interval prior to the firing of a new set of inverter SCR's. Hence, an inverter SCR gating pulse will occur a preset time delay after each timing pulse developed by phase shifter 43.

Consideration will now be given to the operation of the inverter-motor system during the starting mode. After the system has been shut down and during starting, electronic switch 46 will be established in its start or S position as shown in the drawing. When the system is initially turned on, phase shifter 43 generates a timing pulse (see the signal waveforms in FIG. 2) which in effect is converted by pulse generator 47 to a positive-going control pulse for application to analog switch 48. As will be noted in FIG. 2, the leading edge of the first-occurring control pulse coincides with the leading edge of the first-occurring gating pulse supplied to the inverter SCR's 31–36. Thus, a set of SCR's will be fired into conduction at the beginning of the first positive-going control pulse. During the time interval embraced by the first control pulse, a d-c reference current ($I_{ref}$ in FIG. 1) will be gated through analog switch 48 and through switch 46 to the non-inverting or (+) input of comparator 51, the inverting or (−) input of which is coupled to current sensor 52 to receive a signal (designated $I_{bus}$ in FIG. 1) representing the average d-c bus current. The d-c reference current is adjustable and represents the set point or average d-c bus current desired for normal running operation or steady state operating conditions. Preferably, the reference current level, or set point, will be selected to satisfy the speed demanded by the mechanical load driven by motor 41. Any appropriate circuitry may be employed to provide a variable d-c reference current. The circuitry may be manually or automatically controlled. For example, the reference current or $I_{ref}$ may be derived by sensing some parameter or characteristic of a larger system, in which the inverter-motor system is incorporated, in order to automatically control the motor speed in response to that sensed information.

The d-c reference current, gated into comparator 51 during the time interval of the first control pulse in FIG. 2, causes duty cycle controller 18 to operate the chopper switch 16a at the duty cycle required to establish the d-c bus current at the level represented by the reference current. At the conclusion of the control pulse, analog switch 48 is switched to its ground position which causes comparator 51 to command the duty cycle controller 18 to turn-off chopper switch 16a. Chopped d-c voltage, or a series of voltage pulses, will thus be produced at the output of chopper 16, as shown in FIG. 2. The chopper output voltage, which provides an average d-c bus voltage determined by the duty cycle, is applied to d-c bus 21, 22 and through the delay inductance 24 and the conductive inverter SCR's to motor 41. The delay and motor inductances provide filtering or smoothing action so that during the short off times of the chopper, between the periodically recurring voltage pulses, the reactive energy in the inductances causes the bus current (and consequently the motor current) to continue to flow through the conducting SCR's and through the motor in the same direction. This reactive current will flow through the parallel combination of resistor 53 and capacitor 54 and the series circuit comprising isolating diode 55 and inductor 56. As a result, the d-c bus current, during the interval of the first positive-going control pulse, essentially constitutes a continuous pulse as shown in FIG. 2. A bus current pulse is therefore translated through motor 41 and effectively pulse energizes the motor and cranks or turns it one step. In other words, the stator windings will be energized to produce a magnetic field to attract the magnetic poles of the rotor, as a consequence of which the rotor rotates one step to align its poles with the stator field.

When the chopper switch 16a opens to terminate the first bus current pulse in FIG. 2 and after the motor has turned one step, the reactive energy that has built up and has become locked in delay inductance 24 and in the motor inductance must be rapidly moved or dissipated to reduce the SCR current, and consequently the motor current, to zero and commutate the conducting SCR's off. Relatively fast commutation is necessary so that a new set of SCR's may be gated on to crank the motor another step.

In accordance with the invention, the required fast energy removal is facilitated by the parallel combination of resistor 53 and capacitor 54. When the chopper is turned off at the end of the control pulse interval, the reactive energy stored in the delay and motor inductances dissipates in the circuit path comprising the conducting SCR's, resistor 53, capacitor 54, isolating diode 55 and inductor 56. As the reactive current flows through resistor 53, capacitor 54 charges up to a d-c voltage with the polarity indicated in FIG. 1, effectively providing a battery whose polarity opposes the flow of current due to the energy sources constituted by the delay and motor inductances. The d-c voltage, provided by the RC circuit comprising resistor 53 and capacitor 54, expedites the absorption of the reactive energy to decrease the decay time of the motor current to zero in order to permit faster operation of the inverter SCR's during starting.

To explain further, if the reactive energy in an inductance is dissipated in a very low impedance circuit path, a very long time interval would be required for the current to decay to zero. If a d-c voltage source, of opposite polarity, is now inserted in series with that circuit path, the time needed to remove the energy and decrease the current to zero is substantially shortened. In fact, the decay time is inversely proportional to the magnitude of the d-c voltage source. Thus the higher the voltage developed across resistor 53 and capacitor 54, the less time required to absorb the reactive energy and commutate the conducting SCR's off. By effectively dissipating the reactive energy in the d-c voltage source 53, 54, the current can be eliminated fast enough to allow the motor to be cranked up to the speed necessary to develop a satisfactory commutating motor voltage. The negative voltage below zero in the chopper output waveform of FIG. 2 indicates the negative bias produced by the RC combination 53,54. Of course, diode 55 isolates RC circuit 53,54 from the output of the chopper when chopper switch 16a is closed. In other words, diode 55 is polarized to block the flow of current through the network comprising elements 53, 54 and 56 when chopper 16 is operated by controller 18 and develops bus voltage for application to the d-c bus 21, 22.

After the first bus current pulse of FIG. 2 has decayed to zero, pulse generator 47, under the control of a timing pulse from phase shifter 43, produces another control pulse for operating analog switch 48 to turn-on chopper switch 16a and start the production of another bus current pulse. The next set of inverter SCR's in the sequence will be gated on by the occurence of the positive going excursion of the control pulse to deliver an energizing current pulse to the stator windings to cause the rotor to turn another step. After this step has been executed and the chopper switch 16a has been turned off, the bus current pulse decays to zero and the conducting SCR's commutate off. By observing the bus current waveform in FIG. 2 it will be appreciated that after each pulse decays to zero, there will be absolutely no bus current for a fixed time delay. By having a built-in time delay and maintaining the current at zero for a preset interval, the inverter SCR's will be allowed to regain their blocking ability after the bus current has gone to zero.

Under the control of phase shifter 43 a succession of bus current pulses will be developed and as each pulse occurs the next set of SCR's in the sequence will be turned on to effect step-by-step rotation of synchronous motor 41, the energy stored in the delay and motor inductances being rapidly eliminated between bus current pulses by RC combination 53, 54. As the starting process proceeds, and the motor speed increases, the position sensor 44 causes phase shifter 43 to increase the firing rate of the inverter SCR's, thereby increasing the inverter frequency. As the SCR's are fired into conduction at a faster and faster rate during the starting mode, RC circuit 53, 54 will be effective to provide a d-c voltage for rapidly absorbing the energy locked in delay inductance 24 and in the motor inductance. Resistor 53 by itself will absorb energy and quicken the decay time but once the current has gone to zero there is no hold off voltage for the SCR's in the inverter. Additionally, as the motor speed increases a back EMF starts to develop and, depending on the system employed for controlling the firing times of the inverter SCR's during starting, this back EMF may not be synchronized to the inverter and could have a polarity that would tend to cause the current to continue to flow at the time when the conducting SCR's should be commutated off. To avoid this condition, capacitor 54 (preferably an electrolytic capacitor) is employed to maintain the negative voltage and provide a reverse bias for the SCR's. The negative voltage across RC circuits 53, 54 must be greater than the highest peak back EMF encountered during starting. Moreover, the RC circuit should have a time constant so that the negative voltage lasts for the required interval after the current decays to zero to provide hold-off time for the SCR's to allow them to regain their blocking ability.

When motor 41 has attained a preset speed at which the back EMF will effect motor commutating, the starting circuit is no longer necessary and the system should be established in its running mode. This is accomplished by means of a switch controller 59 which in turn is controlled by, and responds to the frequency of, the timing pulses produced by phase shifter 43. When the preset speed is reached, the frequency of the timing pulses causes controller 59 to actuate switch 46 from the start or S position to the run or R position. The reference current $I_{ref}$ will therefore be continuously supplied to comparator 51, as a result of which chopper 16 will be operated continuously to provide a constant d-c bus current for inverter 25 and motor 41. Switch 46 is actuated to its run position at a time when the d-c link current is zero and simultaneously a signal is also applied to gate controller 61 which in turns applies a d-c gating signal to thyristor or SCR 62 to gate and to maintain it on as long as the system is in the running operating mode. SCR 62 shorts out RC circuit 53, 54 and isolating diode 55 and serves as a free-wheeling diode for translating the reactive energy, stored in the delay inductance 24 and in the motor inductance, each time the chopper switch 16a is opened. SCR 62 therefore provides the normal low loss free-wheeling path during the running of the motor.

The system will now function in essentially conventional manner. If the d-c bus current is not at the desired level, comparator 51 will operate controller 18 to change the chopper duty cycle in the direction, and to the extent, necessary to establish and maintain the bus current at the correct level. The motor torque, and thus motor speed, is proportional to the bus current and shaft position sensor 44 controls the firings of the inverter SCR's in response to the motor speed. As a result, the inverter frequency will be "slaved", namely made directly proportional, to the d-c bus current.

Inductor 56 is included to limit the di/dt (time rate of application of current) through the chopper switch 16a and to limit the reverse recovery current that flows through isolating diode 55 during starting and through SCR 62 during running. When diode 55 is conducting, while chopper switch 16a is off and the inverter SCR current is decaying, stored charges accumulate within diode 55. When chopper switch 16a is first turned on, after the inverter SCR's have been commutated off, to initiate the development of another bus current pulse during starting, the full d-c voltage from source 10, 11, 14, 15 plus the voltage across RC circuit 53, 54 will be applied across diode 55. Until the stored charges in diode 55 are swept out, the diode essentially constitutes a short circuit and an extremely high reverse current would flow with an attendant high di/dt. This condition could be harmful to both diode 55 and chopper switch 16a. Similarly, during the running mode when free-wheeling SCR 62 is conducting while switch 16a is open, stored charges build up in SCR 62. When switch 16a is then closed, SCR 62 presents a short circuit for the full d-c voltage across capacitor 15 and very high reverse recovery current would flow through SCR 62 until the stored charges are swept out. To avoid this undesirable condition, inductor 56 is inserted to limit the di/dt in the chopper switch 16a and to limit the reverse recovery current through isolating diode 55 during starting and through free-wheeling SCR 62 during running.

As will be obvious to one skilled in the art, appropriate snubbers may be required across diode 55 and SCR 62 to limit voltage spikes due to stray inductive effects and reverse recovery currents.

In the illustrated embodiment, free-wheeling SCR 62 is gated on by a d-c gating signal. When chopper switch 16a is closed, SCR 62 is reverse biased. This means that the reverse leakage current could be greater than it ordinarily would be if a gating signal was not applied. A gated-on reverse biased SCR may thus heat up more than desired. To circumvent this condition, alternative arrangements (not shown) may be practiced. A diode may be added in series with SCR 62 to take essentially all of the voltage. The gated-on SCR would have a much lower impedance than the diode, as a result of which the diode would absorb most of the reverse voltage. As another alternative, interlock logic could be used to turn off the free-wheeling SCR 62 when chopper switch 16a is closed. Another alternative would be to derate the SCR.

Another embodiment of the invention is shown in FIG. 3 in which a free-wheeling SCR 65 is coupled in parallel with resistor 53 and capacitor 54 so that diode 55 is active for both running and starting and will absorb the majority of the reverse voltage. In this manner, the aforesaid problem caused by increased reverse leakage of the SCR when it is gated on with a d-c signal is eliminated. Additionally, the voltage rating of the SCR may be reduced. The SCR would have to be sized to handle the impulse of current arising from the discharge of the capacitor upon triggering of the SCR or appropriate inductances would have to be provided to insure that excessive di/dt and/or peak currents were not encountered.

While particular embodiments of the invention have been shown and described, modifications may be made, and it is intended in the appended claims to cover all such modifications as may fall within the true spirit and scope of the invention.

I claim:

1. A starting system for a chopper controlled motor-commutated thyristor inverter comprising:
    means for regulating the chopper and for turning on the thyristor switching devices in the inverter in predetermined sets and in a prescribed sequence to current pulse energize the motor to effect step-by-step rotation thereof;
    and means, including a d-c voltage source, for rapidly absorbing the reactive energy locked in the motor inductance to minimize the decay time of the motor current to zero at the termination of each energizing pulse to permit faster turn on of the next set of thyristor switching devices.

2. A starting system for an inverter-motor system wherein a synchronous motor is driven, during running operation, by the output a-c voltage developed by a thyristor inverter, having a series of motor-commutated thyristors that are gated on in predetermined sets and in a prescribed sequence, from an applied adjustable d-c bus voltage received over a d-c bus and through a series-connected delay inductance from the output of a controlled chopper, said starting system comprising:
    means for controlling the chopper to apply bus current pulses to the inverter and for gating on a new set of thyristors during each bus current pulse to supply time-separated energizing current pulses to the synchronous motor to effect step-by-step rotation thereof;
    a circuit path for dissipating the reactive energy that builds up and becomes locked in the delay and motor inductances, at the conclusion of each bus current pulse during which pulse a set of thyristors are gated into conduction, to commutate the conducting thyristors off and reduce the motor current to zero before the next set of thyristors are gated on;
    and a d-c voltage source, included in said circuit path, for expediting the absorption of the reactive energy to decrease the decay time of the motor current to zero in order to facilitate faster operation of the thyristors.

3. A starting system according to claim 2 wherein said d-c voltage source includes a resistor across which a d-c voltage is developed during commutation.

4. A starting system according to claim 2 wherein said d-c voltage souce includes a resistor and a capacitor connected in parallel.

5. A starting system according to claim 2 wherein said d-c voltage source is effectively coupled in series with the delay and motor inductances when the conducting thyristors are being commutated off during the starting mode, and wherein the stored reactive energy produces, across the delay and motor inductances, voltages of a polarity opposed to that of said d-c voltage source.

6. A starting system according to claim 2 wherein the chopper includes a chopper switch, in series with the d-c bus, which is alternated between on and off conditions at a relatively high frequency during running operation, and wherein a thyristor, which is gated into conduction during running operation, shunts and by-passes said d-c voltage source and functions as a free-wheeling diode to provide a current path for the reactive energy in the delay and motor inductances each time the chopper switch is turned off.

7. A starting system according to claim 2 wherein said circuit path includes a network, comprising said d-c voltage source and a series-connected isolating diode, which network is shunt-connected across the d-c bus such that the delay inductance, the motor inductance and the network are all connected in series and conduct the decaying motor current when the conducting thyristors are commutated off, during which commutation time there is no d-c bus voltage produced by the chopper, said diode being polarized to block the flow of current through the network when the chopper is operated and d-c bus voltage is developed for application to the d-c bus.

8. A starting system according to claim 7 wherein the chopper includes a chopper switch, in series with the d-c bus, which is alternated between on and off conditions at a relatively high frequency to produce each bus current pulse during the starting operating mode, and wherein an inductor is included in series with said isolating diode in said network to limit the time rate of application of current through the chopper switch and to limit the reverse recovery current through said isolating diode when the chopper switch is first turned on, after the thyristors have been commutated off, to initiate the development of another bus current pulse during starting.

9. A starting system according to claim 8 wherein and SCR, which is gated into conduction during the running operating mode, is connected to said network, at a circuit junction between said isolating diode and said inductor, in order to by-pass said d-c voltage source and provide a free-wheeling diode for translating the reactive energy, stored in the delay and motor inductances, each time the chopper switch is turned off, said inductor serving to limit the amount of reverse recovery current through said SCR each time the chopper switch is turned on.

10. A starting system according to claim 8 wherein an SCR, which is gated into conduction during the running operating mode, is connected to said network, at a circuit junction between said isolating diode and said d-c voltage source, in order to bypass said d-c voltage source and provide a free-wheeling diode for translating the reactive energy, stored in the delay and motor inductances, each time the chopper switch is turned off, said inductor serving to limit the amount of reverse recovery current through said SCR each time the chopper switch is turned on.

* * * * *